Patented Oct. 23, 1934

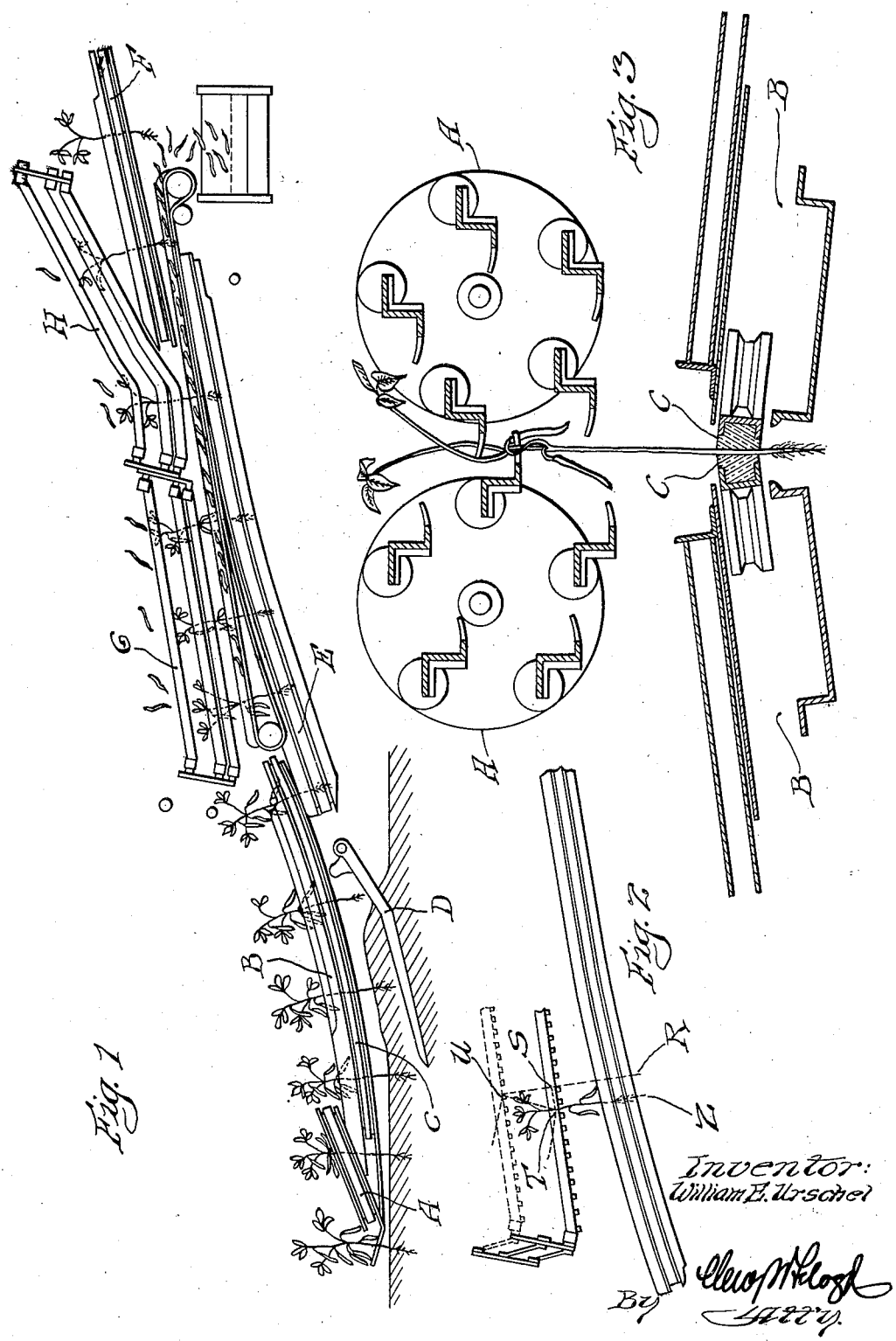

1,977,784

UNITED STATES PATENT OFFICE 1,977,784

PROCESS OF HARVESTING

William E. Urschel, Valparaiso, Ind.

Application January 20, 1930, Serial No. 421,971

10 Claims. (Cl. 56—19)

The present invention relates to a method of harvesting and particularly of bean harvesting and has to do with the removal of the bean and other plants from the ground, and of separating pods from plant stalks.

The invention may be accomplished mechanically by a machine illustrated in the applicant's "Bean harvester" application for Letters Patent which was filed February 23, 1929, and given Serial Number 342,032.

Included in the objects of the invention, among others, are the following:—

A new and novel process of harvesting plants and when desired, removing pods therefrom.

A new and novel process for removing pods from harvested stalks comprising the steps of hooking or raking the stalks, generally, in one direction beginning at one end thereof, and thereafter moving in the opposite direction over the stalk for its entire length.

These, and such other objects as may hereinafter appear, are obtained by the novel process described in the following specification, having as a part thereof a drawing in which:—

Figure 1 diagrammatically illustrates the principle of operation of the process and the relative steps therein when practiced by mechanical means;

Figure 2 diagrammatically illustrates pickers and a stalk carrier and their relative speed for mechanically carrying out the present process; and Figure 3 is a detail, in cross section, of the pickers and a stalk carrier such as is shown in Figure 2.

Like reference characters are used to designate similar parts in the drawing and in the description hereinafter given.

When the process is carried out mechanically, as it may be economically, there may be suitably mounted upon a machine, two oppositely disposed stalk puller frames B. When such stalk pullers are used, the stalk puller frames B are held upon the machine in a spaced relation.

Each stalk puller B has a chain in which is mounted a puller chain C which is an endless band of yielding material such as rubber. Any suitable motive power may be used to drive the adjacent sections of the chain C rearwardly at the same speed at which the machine travels forwardly.

Mouned in front of the stalk puller B is a pod lifting device A having an endless pod lifter chain of the same construction as the stock puller chain. The pod lifter chain, however, is provided with a plurality of horizontally projecting bristles which are positioned to run close together in proximity to the ground whereby to raise any plant pods or stalks which are prostrate on the ground.

When it is not possible to lift the plant pods above the grip of the stalk puller chain and the bean pods pass between the chains C, the tension on the puller chains should be reduced to such an extent that the pressure of the puller chains will not be enough to bruise or mash the bean pods.

The stalk pullers B act also as a conveyor to carry the plant stalks to a position where they may be grasped by a stalk carrier E, while a plow D under the puller chain acts as a means for raising the plant stalks from the ground concurrently with grasping of the plants by the stalk pullers B. Such plow D may be pivoted on studs as shown for adjustment.

To grip and convey the stalks while the pods are being picked therefrom, the stalk carrier or holder E may be mounted to the rear of the stalk pullers B in such a manner that the bean stalks are grasped and conveyed rearwardly after being released by the stalk pullers B. To permit picker fingers to pass through the stalk as low as possible, the stalk of the plant is grasped by its root portion which extends below the stalk pullers B. The construction of the stalk holder E is similar to that of the stalk puller B, it also having sprockets and carrier chains.

There may be mounted to the rear of the stalk carrier E a stalk discharge F which is adapted to grasp the stalks as they are released by the stalk holder E and convey them rearward as the top portion of the stalk is being recombed by additional pickers. The stalk discharge F also acts as a means to evacuate the picked stalks from the machine. In construction, the stalk discharge F may be similar to the stalk puller B.

Pod pickers may be mounted over the stalk carrier, and additional pickers may be disposed over the stock discharge.

The pod pickers may thus comprise two sections, a forward section G, and a rear section H. Each section may include two oppositely disposed revolving picker drums which have fingers adapted to hook under the stem of the bean pod and pull it loose from the bush.

The picker fingers, may have a cross section as shown in Figure 3, and consist of a strip having a plurality of picking fingers with a turned up portion adapted to hook under the stem of a pod as the picker fingers pass through the foliage on a stalk.

One set of the fingers of the pullers in the illustrated device moves inwardly and upwardly through the bean stalk beginning at the top of the stalk and gradually working down to the bottom. As the pickers pass through the stalk, the fingers of the pickers hook under the stem of the bean pod between the pod and the stalk and pull the pod free from the stalk.

Said forward section G of pickers act more as hooks due to the width of the space between the picker fingers which will permit the pods to pass between the fingers. These pickers should pass through the stalk without severely jerking the stalks or pulling them from the grip of the stalk carrier. After the forward section G of pickers has passed through the bean stalk the greater part of the bean pods are pulled and the clusters of leaves and pods are broken up. It is then possible to have the fingers of the rear section H of pickers set closely enough together that a bean pod will not pass between the fingers. Thus the remaining bean pods are combed from the stalk beginning at the bottom and gradually working to the top.

Referring to the diagrammatical view disclosed in Figure 2, the line T—U represents the plane through which the picker fingers travel. The line R—W indicates a position of a bean stalk after a movement of T—S. For the picker fingers to pass through the bean stalk with the least amount of resistance, the relative speed of the picker fingers and stalk carrier should be such that should point T, representing a point on the plane of the picker fingers T—W, and line T—Z, move to a new position at point W, it will fall on line R—U on the new position of the bean stalk. The speed at which the stalk is carried by the stalk carrier should be the same as the speed at which the picker finger moves rearwardly. The speed at which the fingers may be made to move rearwardly may be regulated by changing the angle at which the drive plates of the pickers are mounted in respect to the stalk carrier.

A harvester comprising the several elements illustrated may be propelled on its own power down a row of bean stalks so that such machine passes over the row with the line where the two endless puller chains run together registering with the bean row. When the several instrumentalities are operated along a row in this manner, all of the instrumentalities being driven by one or more prime movers in synchronism, or other instrumentalities are similarly operated, the bristles in the pod lifter A, brush the bean pods up from the ground and lift and maintain the prostrate stalks in an upright position.

The bean stalks are next engaged, adjacent to the ground, by an endless rubber tired puller chain C or like instrumentality. The bean stalks are lifted from the ground. The plow or lifter D, passing under the bean row, assists the stalk puller B in raising the bean stalks from the ground.

As the bean stalks are lifted from the ground, they are elevated and concurrently conveyed to a position where they are grasped at the roots by a stalk carrier E.

As the stalks are conveyed rearwardly by the stalk carrier, picker fingers C pass through the top of the stalk and gradually work down until the complete stalk is combed. The stalk may then be grasped by the stalk discharger F to be conveyed further rearwardly.

At this instant, the pickers over the discharger F begin to recomb the bush beginning at the bottom and gradually working to the top until the stalk has been recombed by the pickers and all the pods removed from the stalk.

When conditions are favorable, as when the bean stalks are standing in good shape, the pod lifting attachment A may be omitted without affecting the performance of the machine. When the ground is soft and other conditions are favorable, the plow D also may be omitted. A stalk puller B is capable of pulling the bean stalks without the aid of the plow under favorable conditions.

I claim:

1. A process of harvesting pod plants which comprises the steps of lifting the pods, gripping the stalks therebeneath, conveying the stalks and pods in a rectilinear path within a plane common to the axis of such stalks, and combing the stalks at an angle diverging from said plane.

2. A process of harvesting pod plants which comprises the steps of lifting the pods, gripping the stalks therebeneath, conveying the stalks in a path within a plane common to the axes of said stalks, and hooking the pods therefrom while being so conveyed, the hooking movement being divergent from said plane at the section thereof traversed by said path.

3. A process of harvesting which comprises the steps of brushing vertically the lower foliage of pod plants, gripping the plant adjacent to the ground, elevating the plant from the ground, gripping the plant at its roots when elevated and conveying the plant thereby, and hooking the pods from the plant while so held.

4. A process of harvesting comprising the steps of brushing vertically the lower portions of the foliage of pod plants, gripping the plants adjacent to the ground and beneath said brushed portions breaking the ground about the roots of said plants, conveying the plants by their roots, and raking the pods from the plants while held by the roots.

5. In bean harvesting, the steps of pulling bean pods from a stalk by beginning at the top of the plant and working downwardly to the bottom of the stalk, and thereafter working upwardly from the bottom to the top of such stalks.

6. In bean harvesting, the steps of gripping bean plants, and of pulling the bean pods from a stalk so held by combing from the top of the stalk downwardly to the bottom of said stalks and subsequently combing from the bottom thereof to the top.

7. In a harvesting process, the steps of gripping the plants, moving the plants along a rectilinear path, and combing the plants while moving in said path and angularly thereto to compensate for the travel of the plant during the combing operation.

8. That process of harvesting which comprises moving plants along a rectilinear path, and treating said plants with a device moving substantially axially to said plants and angularly to the path of the movement of said plants, such treatment being had with the speed of said device synchronizing with the movement of said plants along said path whereby to prevent angular disturbance of the plants with respect to such path.

9. A process of harvesting pod plants that comprises the steps of gripping said plants beneath the pods thereon, conveying said plants in a plane common to the axis of the stalks thereof, and combing said plants at an angle to such plane during such conveyance.

10. A process of harvesting pod plants and which comprises the steps of gripping said plants beneath the pods thereon to hold said plants in a substantially upright position, conveying the upright plants horizontally within a vertical plane, and combing said plants upwardly obliquely from the vertical during such conveyance.

WILLIAM E. URSCHEL.